United States Patent
Gou et al.

(10) Patent No.: US 8,520,582 B2
(45) Date of Patent: Aug. 27, 2013

(54) METHOD FOR ALLOCATING MULTIMEDIA BROADCAST MULTICAST SERVICE (MBMS) RESOURCES AND RECEIVING NON MBMS DATA

(75) Inventors: Wei Gou, Shenzhen (CN); Bin Wang, Shenzhen (CN); Nan Zhao, Shenzhen (CN)

(73) Assignee: ZTE Corporation, Guangdong (CN)

( * ) Notice: Subject to any disclaimer, the term of this patent is extended or adjusted under 35 U.S.C. 154(b) by 152 days.

(21) Appl. No.: 13/000,907

(22) PCT Filed: Jun. 16, 2009

(86) PCT No.: PCT/CN2009/072282
§ 371 (c)(1),
(2), (4) Date: Mar. 14, 2011

(87) PCT Pub. No.: WO2009/155829
PCT Pub. Date: Dec. 30, 2009

(65) Prior Publication Data
US 2011/0310785 A1    Dec. 22, 2011

(30) Foreign Application Priority Data

Jun. 23, 2008    (CN) .......................... 2008 1 0125261

(51) Int. Cl.
*H04W 72/04*    (2009.01)
(52) U.S. Cl.
USPC ........................................................ 370/312
(58) Field of Classification Search
USPC ................................................ 370/254–340
See application file for complete search history.

(56) References Cited

U.S. PATENT DOCUMENTS

| 2011/0021224 A1* | 1/2011 | Koskinen et al. | 455/507 |
| 2011/0075621 A1* | 3/2011 | Sung et al. | 370/329 |

FOREIGN PATENT DOCUMENTS

| CN | 1738486 A | 2/2006 |
| CN | 1980468 A | 6/2007 |
| CN | 101064617 A | 10/2007 |
| CN | 101114921 A | 1/2008 |

OTHER PUBLICATIONS

International Search Report for PCT/CN2009/072282, Completed by the Chinese Patent and Trademark Office Aug. 18, 2009, 4 Pages.

\* cited by examiner

*Primary Examiner* — Ayaz Sheikh
*Assistant Examiner* — Debebe Asefa
(74) *Attorney, Agent, or Firm* — Brooks Kushman P.C.

(57) ABSTRACT

The present invention discloses a method for allocating MBMS resources and a method for receiving non MBMS data, wherein said method for allocating MBMS resources comprises: way 1: a transmitter using parts on the MBMS resources allocated for the MBMS to send a non MBMS, and informing a receiver of usage state of resources which are used to send the non MBMS in said parts of the MBMS resources through system information; or way 2: a transmitter using parts of the MBMS resources allocated for the MBMS to send a non MBMS only for one or more receivers which are not power limited. The present invention can avoid configuring the MBMS for the over allocation MBMS subframes using complex scheduling algorithms, and implements the flexible allocation of the MBMS subframes.

15 Claims, 4 Drawing Sheets

METHOD FOR ALLOCATING MULTIMEDIA BROADCAST MULTICAST SERVICE (MBMS) RESOURCES AND RECEIVING NON MBMS DATA

CROSS-REFERENCE TO RELATED APPLICATION

This application is the U.S. national phase of PCT Appln. No. PCT/CN2009/072282 filed Jun. 16, 2009 which claims priority to Chinese Application No. 200810125261.0 filed Jun. 23, 2008, the disclosures of which are incorporated in their entirety by reference herein.

TECHNICAL FIELD

The present invention relates to a method for allocating multimedia broadcast multicast service (MBMS) resources and receiving non MBMS data, and particularly, to in mixed carriers a method for receiving non MBMS data transmitted by MBMS resources.

BACKGROUND OF THE RELATED ART

Along with the popularization of large screen and multifunction mobile phones, the applications of mobile data services are more and more extensive. The requirements for the mobile communication are no longer limited to calls, messages, network surfing service using mobile phones and so on. Owing to rapid development of the internet, great quantities of multimedia services rush. Various wide bandwidth multimedia services, such as the video conference, television broadcast, video on demand, advertisement, online education, and interactive game and so on, appear continuously, which satisfies continuously promoted service requirements of mobile users on the one hand, and brings new service increasing points for the mobile operators on the other hand. These mobile multimedia services require that a plurality of users can receive the same data at the same time, and compared with common data, these mobile multimedia services have characteristics such as the large volume of data, long duration, and delay sensitivity and so on.

In order to effectively use mobile network resources, the 3rd Generation Partnership Project (3GPP) brings forward the multimedia broadcast multicast service (namely MBMS). One point to multipoint service that one data source sends data to a plurality of users is provided in the mobile network, and thereby the network resources sharing is implemented and the utilization ratio of network resources (especially the precious air interface resources) is promoted. The MBMS is a technique that sharing network resources are transmitted from one data source to a plurality of destinations. The MBMS defined by the 3GPP not only can implement multicast and broadcast of message type in pure text with low speed, but also can implement multicast and broadcast of multimedia service in high speed to provide various video, audio and multimedia services. This undoubtedly complies with the development trend of the mobile data in the future, and provides a better service prospect for the development of the 3G and 4G.

In the existing LTE R8, the MBMS transmission modes are sorted into being on the dedicated carrier and on the sharing carrier. The chief different between the two transmission modes are: in the dedicated carrier mode, the carrier only bears the MBMS; while in the sharing carrier mode, which is also called mixed carrier mode, the carrier not only bears the MBMS, but also bears the non MBMS (such as unicast services).

In the networking mode using the mixed carrier to bear the MBMS, the allocations and applications of MBMS and non MBMS resources coexists. At present, the main viewpoint in the field is that the MBMS and the non MBMS are time division multiplexed, and the smallest unit multiplexed is subframe. As such, a problem of resources allocating may exist.

Figure 1:
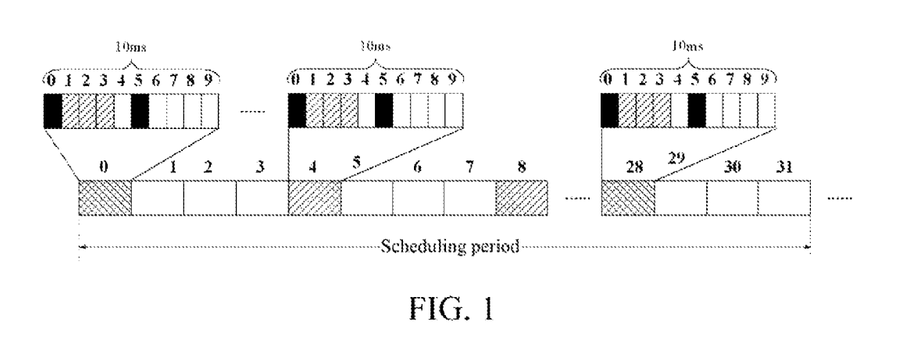
FIG. 1 is a schematic diagram of configuring multicast subframes using the Two-level way in the prior art.

When the MBMS and non MBMS is time division multiplexed, influences of a plurality of factors, including unicast service delay, over resources allocation, MBMS service scheduling granularity, system overhead, scheduling flexibility and so on, should be considered simultaneously Concerning the resources allocation, currently a reasonable configuration method in the field is to use the Two-level way to configure. For instance, FIG. 1 is a typical schematic diagram of a Two-level way, wherein the  denotes the Multimedia Broadcast multicast service Single Frequency Network (MBSFN) frames, the  denotes the MBSFN subframes and the  denotes the reserved subframes for unicast services (the 0th and 5th subframe), respectively shown in the figure. Other resources allocation methods in the prior art are largely identical but with minor differences compared with FIG. 1. A problem that the resources allocation is not inflexible exists in all of these methods, and the situation of over resources allocation will be brought out.

The following will describe the Two-level method in the prior art. The Two-level method uses 2 levels of parameters to demonstrate the positions of the particular subframes which bears the MBMS. The details of the method are as below:

In the radio frame level (macro-level), parameter N, and using $2^N$ radio frames are used as a scheduling period to allocate resources discretely. The value of the N can be 3 bits. The size of the N is related to the defined radio frame modification period. Assuming the defined radio frame modification period is 32 radio frames, then the maximum value of the N is 5, which satisfies the relationship of the $2^5 =32$.

In the subframe level configuration (micro-level), 3 bits is used. The value of the 3 bits refers to the number of the continuous subframes from the subframe #1 (except for subframes#0 and #5).

Additionally the discrete way is used in the radio frame allocation, and the centralized way is used in the subframe allocation. This design considers the delay effect of the MBMS on the non MBMS; and the radio frame level is fixed on 320 ms, namely 32 radio frames, thus the requirement of the MBMS granularity can be satisfied.

At present, the major problem using this way is when a system configures the number of subframes, it lacks flexibility. Because of the limitation of above method, when a system needs to configure 129 multicast subframes during the 320 ms scheduling period, it will appear the situation that it only can configure 160 subframes (namely the number of the allocated subframes must be the integral multiples of 32), and thereby 31 subframes are over allocated in another word.

Against to the problem of the inflexibility in allocating MBMS resources based on this Two-level way by a system and the complexity of the system scheduling, a solution is provided in this application.

CONTENT OF THE INVENTION

The technical problem to be solved in the present invention is to provide a method for allocating a multimedia broadcast multicast service resources and a method for receiving non MBMS data to implement flexible allocation of the MBMS subframes.

In order to solve above problem, the present invention provides a method for allocating multimedia broadcast multicast service (MBMS) resources, comprising: way 1: a transmitter using parts of the MBMS resources allocated for MBMS to send a non MBMS, and informing a receive of usage state of resources used to send the non MBMS in said parts of the MBMS resources through system information; or way 2: a transmitter using parts of the MBMS resources allocated for the MBMS to send a non MBMS only for one or more relay stations; wherein said MBMS resources are composed by OFDM symbols except for OFDM symbols occupied by PDCCH in MBSFN subframes.

In said way 1, said transmitter detects the usage state of resources for sending the non MBMS in current scheduling period, and if a utilization ratio of the resources for sending the non MBMS is larger than a pre-set threshold, then the transmitter schedules said parts of the MBMS resources to send the non MBMS, otherwise the transmitter does not schedules said parts of the MBMS resources.

When said transmitter schedules said parts of the MBMS resources to send the non MBMS, control information of all the MBMS resources carries identification information of all the receivers'; if said transmitter schedules MBMS required resources to send the MBMS, the transmitter does not schedules said parts of the MBMS resources, and control information of said parts of the MBMS resources carries identification information of corresponding receivers.

In said way 1, said transmitter informs the receiver whether said parts of the MBMS resources are used by adding one bit identification in the system information.

In said way 2, said transmitter receives terminal type registration information including a power limitation state of the receiver sent by said receiver during accessing, and chooses corresponding receivers to use the parts of the MBMS resources allocated for the MBMS to send the non MBMS according to the terminal type register information.

In said way 2, when said transmitter uses parts of the MBMS resources allocated for the MBMS to send the non MBMS, control information of said parts of the MBMS resources only carries identification information of one or more relay stations.

Said system information is signaling used to informing the receivers by the transmitter, and said system information is system messages, control signaling or dedicated signaling.

In said transmitter using parts of the MBMS resources which are allocated for the MBMS to send a non MBMS, said parts of the MBMS resources are all the MBMS resources or zero.

Said parts of the MBMS resources includes idle MBMS resources which is not used to send the MBMS after said transmitter scheduling the MBMS, and idle MBMS resources of over allocation when said transmitter allocates the MBMS.

A method for receiving non multimedia broadcast multicast service (MBMS) data on MBMS resources, comprising: a receiver which has a non MBMS determining whether a transmitter uses parts of the MBMS resources to send non MBMS data according to received system information, if yes, then said receiver monitoring the MBMS resources which sends the non MBMS, and receiving non MBMS data from corresponding MBMS resources.

According to bit identification in said system information, said receivers determines whether the transmitter uses parts of the MBMS resources.

If said receiver determines that said transmitter does not uses said parts of the MBMS resources, then said receiver does not monitor the MBMS resources.

When receiving non MBMS data from corresponding MBMS resources, said receiver firstly analyzes control information including the identification information of receivers, a modulation mode and data length in corresponding MBMS resources, if analyzing successfully, then said receiver receives non MBMS data according to analyzed parameters; or refuses receiving data in said corresponding MBMS resources.

A method for receiving non multimedia broadcast multicast service (MBMS) data on MBMS resources, comprising: one or more relay stations monitoring control information in the MBMS resources, and receiving non MBMS data from corresponding MBMS resources, wherein said MBMS resources are composed by OFDM symbols except for OFDM symbols occupied by PDCCH in MBSFN subframes.

When receiving non MBMS data from corresponding MBMS resources, said receiver firstly analyzes control information including the identification information of receivers, a modulation mode and data length in corresponding MBMS resources, if analyzing successfully, then said receiver receives non MBMS data according to analyzed parameters; or refuses receiving data in said corresponding MBMS resources.

Comparing with the prior art, the present invention can avoid configuring the MBMS for the over allocation MBMS subframes using complex scheduling algorithms, and implements the flexible allocation of the MBMS subframes.

PREFERRED EMBODIMENTS OF THE PRESENT INVENTION

The method for using the multimedia broadcast multicast service resources and the method for receiving the non MBMS data provided by the present invention to overcome the disadvantages existing in the traditional technical scheme are described through the following examples. The following detailed description of the examples does not mean to limit the present invention.

Figure 2:
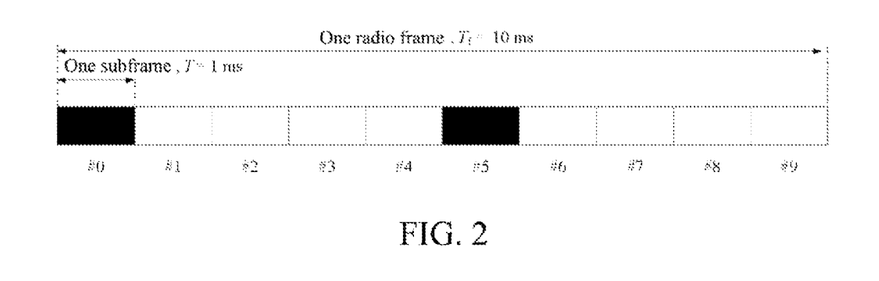
FIG. 2 is a schematic diagram of a radio frame structure of the LTE type 1.

Take the LTE system as an example to describe the embodiment of the method according to the present invention. The radio frame structure of the LTE type 1 is suitable for the FDD, and as it is shown in FIG. 2.

One radio frame comprises 10 subframes, and the length of each subframe is 1 ms. The subframes are numbered from #0 to #9, wherein the subframe #0 and #5 are used to bear the system information, but not to bear the MBMS. Thus only 8 subframes of each radio frame can be used to bear the MBMS.

Concerning the factor of the MBMS granularity, the MBMS modification scheduling period is set to 320 ms currently, namely 32 consecutive radio frames or continuous 320 ms are one modification scheduling period.

Besides, the above system information includes: a cell identification (such as ID), cell bandwidth state, and parameter information for informing UE of the current time and frequency resources (such as subframe), allocation state of the resources and so on;

In above radio frame, for the other subframes excepting for subframes #0 and #5, the former 1 to 4 symbols (the particular values are configured by systems) of each subframe are used to bear the control information. The control information will be send down to corresponding receivers along with each subframe, and the control information includes the parameter information such as the IDs of the receivers. According to published techniques currently (the LTE protocol 36.211v830, the published date is in May 2008), the control information is sent by the Physical Downlink Control Channel (PDCCH).

At first, a system calculates the number of subframes it requires according to the requirement of MBMS traffic, and calculates the number of subframes allocated for the MBMS according to the Two-level or other methods. Because of the limitation of the algorithm itself, a problem that the algorithm of allocating subframes for MBMS cannot accurately allocate the number of subframes required by the MBMS occurs in this case, and thereby it results in that the number of allocated subframes is more than the required. Therefore, there are over allocated subframes, which induces that a part of the MBMS resources does not send the MBMS. Along with the establishment and evolution of the standard, in order to describe conveniently, above MBMS resources are called MBSFN subframes in the LTE. According to published techniques currently (chapters 6.5 and 6.7 of the LTE protocol 36.211v830, LTE protocol 36.300v840 and LTE protocol 36.311v820, the published dates are in May 2008 or before), the MBMS resources are actually composed by the resources in MBSFN subframes except for the OFDM symbols occupied by the PDCCH. Said parts of the MBMS resources include idle MBMS resources which do not send MBMS after said transmitter schedules the MBMS, and idle MBMS resources over allocated when said transmitter allocates MBMS.

The present invention carries out in two ways. The first way is: when resources is in shortage, a base station uses MBMS resources to sends the non MBMS (such as unicast services) on the subframes over allocated for the MBMS, and thereby the MBMS resources of subframes over allocated for the MBMS are reused; and the system needs to send the situation that whether subframes are over allocated with MBMS resources in the allocation process and whether the over allocated subframes for the MBMS are used by non MBMS and the subframe allocation information of MBMS to terminals at the same time.

The second way is: a system pre-defines the allocation rules for over allocated subframes for MBMS in corresponding protocols, and a transmitter uses the over allocated subframes for only one or more receivers (such as notebook PC terminals and relay station terminals) which have a certain non MBMS (such as unicast service) defined in protocols, and does not use the over allocated subframes for the other receivers. Thus the subframe allocation information for MBMS should not be informed to receivers through the system information. Therefore, the one or more receivers supporting unicast services monitors all subframes in current scheduling period according to the pre-defined allocation rules of over allocation subframes for the MBMS in the corresponding protocols.

For above two ways, each will be described by two examples and one application example.

Figure 3:
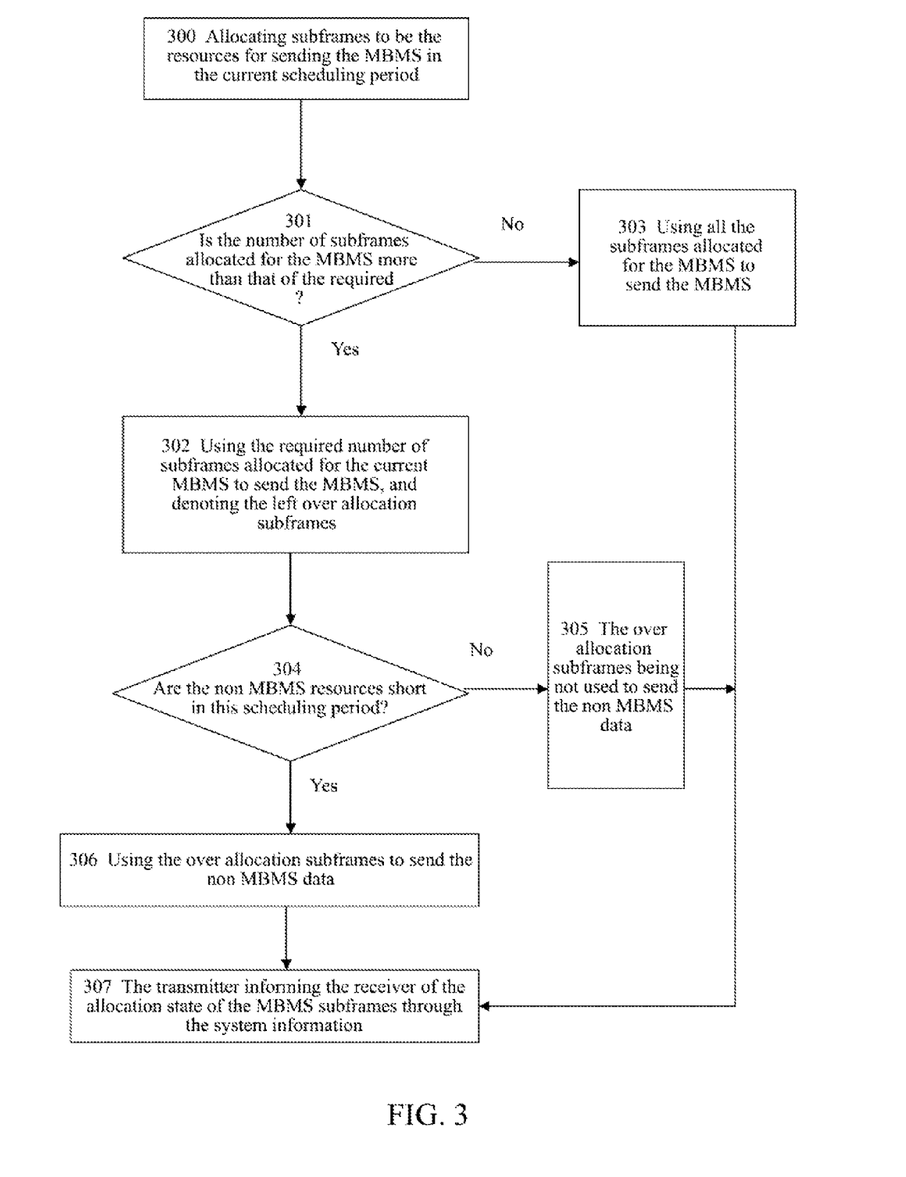
FIG. 3 is a flow chart of an allocating method in the example of the present invention.

FIG. 3 is a flow chart of an allocating method in an example of the present invention, which shows the first way of the present invention. This way comprises the following steps:

step 300, according to the requirement of the MBMS traffic, allocating a certain number of subframes to be the resources for sending the MBMS in the current scheduling period;

according to the requirement of the MBMS traffic, calculating the number of required subframes (the prior art), and through the existing method (such as the Two-level method), obtaining an allocation scheme for the number of the subframes nearest to said number of the subframes, and allocating corresponding number of subframes in said allocation scheme for the MBMS.

step 301, determining whether the number of subframes allocated for the MBMS in this case is more than the number of subframes the MBMS traffic required, if yes, carrying out step 302, otherwise carrying out step 303;

step 302, using a required number of subframes allocated for the current MBMS to send the MBMS, and for the purpose of describing conveniently, the left over allocated subframes being denoted as over allocation, and carrying out step 304;

herein the transmitter scheduling the required number of subframes of the current MBMS according to the existing technical procedures;

step 303, using all the subframes allocated for the MBMS to send the MBMS, where there is no over allocation subframes, and carrying out step 307;

step 304, according to usage of resources for sending non MBMS, the transmitter determining whether resources is in shortage in this scheduling period (320 ms), if the resources is in shortage, then carrying out step 306, otherwise carrying out step 305;

For determining whether system resources are short in this scheduling period, a simple method is given herein, which is implemented by setting a threshold. If the transmitter detects that the current utilization ratio of the non MBMS resources (such as unicast services) does not get to the set threshold M %, then it determines that the non MBMS resources is not short. Where M can be 50, and M can be obtained by actual statistics based on the real system, and can also be obtained according to the practice.

If the transmitter detects that the utilization ratio of the current non MBMS (such as unicast services) resources is large than (including equal to) the threshold M %, it refers to that the non MBMS resources is in shortage.

Other methods can be used alternatively to implement the determination on the system resources described herein, and the present invention is not limited to this.

step 305, the non MBMS (such as unicast services) data being not sent in the over allocation subframes, and carrying out step 307;

if only use the MBMS subframes to send MBMS, then the control information carries the identification information (such as ID information) of receivers corresponding to these MBMS subframes;

step 306, using the over allocation subframes to send the non MBMS (such as unicast services) data, and carrying out step 307;

herein all the over allocation subframes are used for the non MBMS (such as unicast services), and as for how to use the over allocation subframes specifically or which of them are used, the transmitter performs scheduling corresponding to requirement according to the existing technical procedures;

when the transmitter sends these MBMS subframes and over allocation subframes, the control information carries the identification information (such as ID information) of all the receivers corresponding to the above subframes, but only the MBMS subframes bears the MBMS, and over allocation subframes bears the non MBMS (such as unicast services);

step 307, the transmitter informing the receiver of the allocation information of the MBMS subframes for the MBMS through the system information, said allocation information of the subframes including: whether there are over allocation subframes and whether the over allocation subframes are used by non MBMS, wherein said system information is the signaling sent by the transmitter which is used to inform receivers, and said system information can be system messages, control signaling or dedicated signaling;

the transmitter informing the receiver of the usage state of the over allocation subframes to receivers by adding one bit overhead in the system information (the sending of the system information can combine with the periodicity, namely sending the system information once in each 32 frames, or in shorter period), and ending the flow.

Adding one bit overhead can be defined as following:

"1" denotes that the non MBMS (such as unicast services) of the system uses the over allocation subframes for the MBMS in this scheduling period; and "0" denotes that the non MBMS (such as unicast services) of the system does not use the over allocation subframes for the MBMS in this scheduling period.

Or, "1" denotes that the non MBMS (such as unicast services) of the system does not use the over allocation subframes for the MBMS in this scheduling period; and "0" denotes that the non MBMS (such as unicast services) of the system uses the over allocation subframes for the MBMS in this scheduling period.

Figure 4:
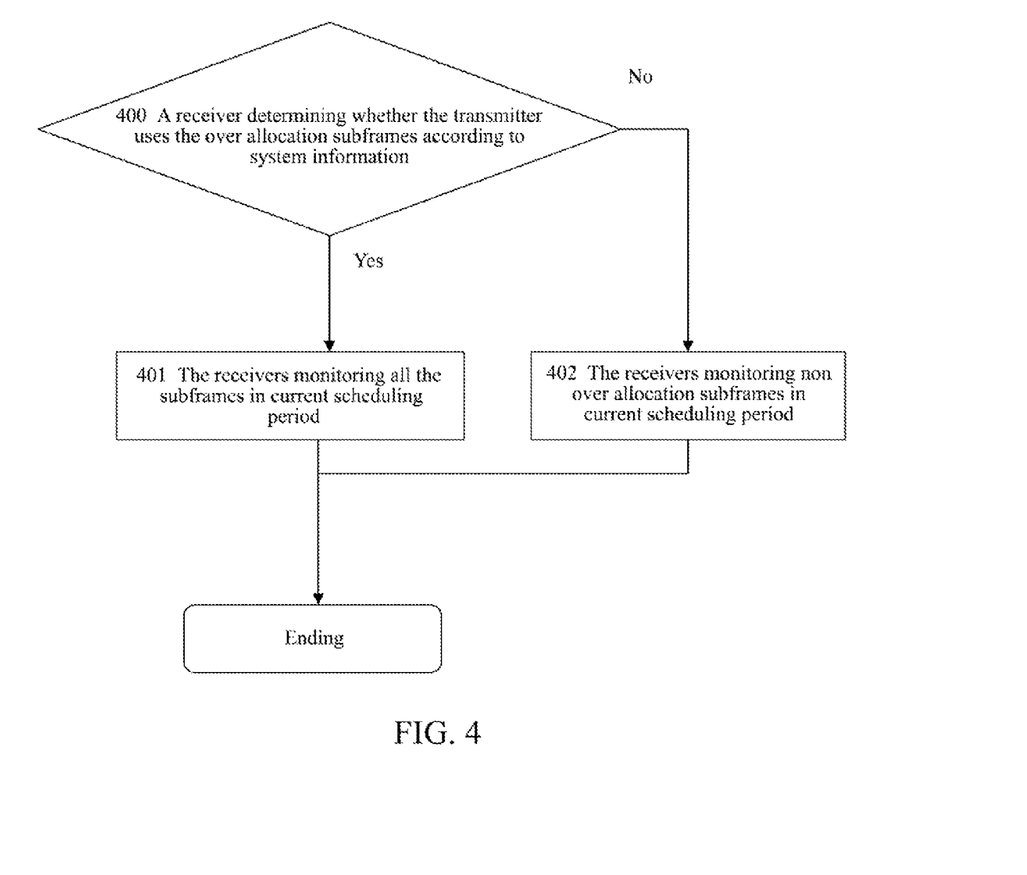
FIG. 4 is a flow chart of a receiving method in the example of the present invention.

FIG. 4 is a flow chart of a method for receiving the non MBMS data in the example of the present invention, and this method for receiving data comprises the following steps:

step 400, a receiver receiving the system information, and reading the bits in this system information to determine and recognize whether over allocation subframes are used by the transmitter, if yes, then carrying out step 401, otherwise carrying out step 402;

step 401, in this case, some of the subframes initially allocated for the MBMS by the transmitter being used to send the MBMS, while the others are used to send the non MBMS services (such as unicast services);

the receivers which have a certain non MBMS and the receivers which have the MBMS monitoring all the subframes in current scheduling period (including: the subframes which are used to send the MBMS and the over allocation subframes which are used to send the non MBMS), and determining whether this subframe should be received according to the control information in the subframe (the receivers which have the non MBMS receive non MBMS data from the over allocation subframes, and the receivers which have the MBMS receive the MBMS data from the other subframes allocated for the MBMS), and the flow ending;

step 402, in this case, the subframes initially allocated for the MBMS by the transmitter are only used to send the MBMS, but not used to send the non MBMS (such as unicast services);

the receivers which have the MBMS monitoring the above subframes (all the subframes being used to send the MBMS) in the current scheduling period;

while the receivers which only have a certain non MBMS need not to monitor the above subframes, and the flow ending.

For the above two examples, it should be noted that when the transmitter uses these MBMS subframes and over allocation subframes to send data, the control information carries the identification information (such as the ID information) of all the receivers which receive the above subframes, and only the MBMS subframes bear the MBMS and the over allocation subframes bear the non MBMS (such as unicast services), therefore all the receivers will receive these subframes;

and when only MBMS subframes are used to send data, the control information carries the identification information (such as the ID information) of the receivers corresponding to the MBMS subframes, therefore the receivers which do not have the MBMS will not receive the data in these subframes;

when a plurality of receivers monitor these subframes, the control information will be sent down to each receiver along with each subframe, and each receiver will read current control information (including the identification information of the receivers, the modulation mode and the data length and so on) and analyze this control information, and only the receivers related to the services bore in the subframes can successfully analyze the control information of the subframes to obtain corresponding parameters. If a receiver analyzes the control information successfully, then it begins to analyze and obtain each variety of parameters to receive data in the subframes; otherwise the receiver cannot analyze the control information of this subframe, and thus refuses receiving this subframe and continue to process the next subframe, until all the subframes are monitored. For instance, if a receiver supporting the MBMS can not analyze the control information of an over allocation subframe, then it refuses receiving data in the over allocation subframe.

It will describe the present invention using an application example below.

After calculating according to current MBMS traffic, a certain system obtains that 37 subframes should be allocated to the MBMS in this scheduling period to satisfy the requirement of the MBMS transmission. However, because of the limitation of the allocation algorithm, the allocation scheme nearest to that of 37 subframes can only allocate 40 subframes, which is obviously that 3 subframes are over allocated. For the purpose of describing conveniently, the 3 subframes are denoted as the over allocation subframes.

For the transmitter, according to said method of the present invention, a base station pre-estimates the usage of the system resources, and deals as follows:

if resources are short in the next 320 ms, then the base station sends unicast services in the 3 over allocation subframes which are over allocated for the MBMS, and informs the terminal of the usage state of the over allocation subframes by the base station through the system information;

if resources is not in shortage in the next 320 ms, then the base station will not send unicast services in the 3 over allocation subframes which are over allocated for the MBMS, and informs the terminal of the usage state of the over allocation subframes by the base station through the system information.

It should be noted that the basis of determining that the resources is short in current scheduling period and the method for informing the terminal of the decision of the base station through the system information are the same with said method of the above example, and it will not be repeated herein.

For the receiver, after the terminal obtaining the allocation of the MBMS subframes and whether subframes, which are over allocated for the MBMS, are used through the system information, the processing for the unicast terminal which has services is as follows:

if the base station uses the over allocation subframes, then the terminal which has the unicast services monitors all the 40 subframes allocated for the MBMS to assure that the terminal can receive data from the 3 over allocation subframes which are over allocated for the MBMS;

if the base station does not use the over allocation subframes, then the terminal which has the unicast services does not need to monitor all the 40 subframes which are allocated for the MBMS, and only monitors other non MBMS subframes except for the 40 subframes in the current scheduling period.

In the second way, during various receivers access, the receivers will send the terminal type registration information, and this information includes parameters of power limitation and so on. The system can define that the over allocation subframes can only be used to the receiver without power limitation (such as a notebook PC terminal, vehicle station and relay station and so on) in protocols. Thus the transmitter adds control information in the MBMS resources and only carries the identification information (such as the id information) of protocol defined receivers' in the control information when sends these subframes. Once the transmitter detects the over allocation subframes, the transmitter can use these over allocation subframes without needing to determine the resources states in current period. Above particular receivers have to monitor all the subframes all the time, while the other receivers will not receive the over allocation subframes.

Figure 5:
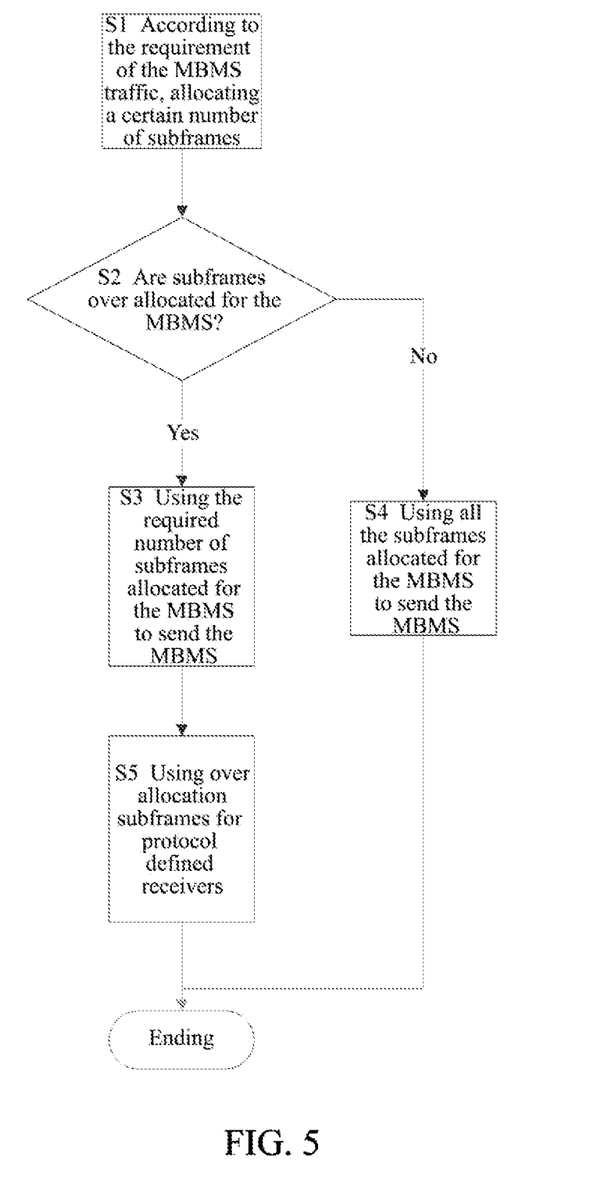
FIG. 5 is a flow chart of another allocating method in the example of the present invention.

Therefore, in the flow of said allocating method shown in FIG. 3, if the system pre-defines the using rules of the over allocation subframes in corresponding protocols, then after the transmitter using the over allocation subframes to bear unicast services, and only for one or more protocol defined varieties of receivers which are not power limited and have the non MBMS (such as unicast services), the transmitter sends data in this over allocation subframes using MBMS resources, and does not use the over allocation subframes for the other receivers. Thus the usage state of the over allocation subframes should not be informed to the receiver through the system information;

As it is shown in FIG. 5, after the system pre-defines the using rules of the over allocation subframes in corresponding protocols, the particular implementing way of each step is the same with the corresponding step in the flow of said allocation method shown in FIG. 3:

step S1, according to the requirement of the MBMS traffic, allocating a certain number of subframes to be the resources sending the MBMS in current scheduling period;

step S2, the transmitter determining whether the number of subframes allocated for the MBMS in this case is more than the number of the MBMS traffic required subframes, if yes, carrying out step S3, or carrying out step S4;

step S3, using the required number of subframes allocated for the current MBMS to send the MBMS, and for the purpose of describing conveniently, the left over allocated subframes being denoted as over allocation, and carrying out step S5;

herein the transmitter scheduling the current MBMS required number of subframes according to existing technical procedures;

step S4, using all the subframes allocated for the MBMS to send the MBMS, where there are no over allocation subframes in this case, and ending the flow;

step S5, for one or more protocol defined types of particular terminals (such as notebook PC terminals and relay stations) which have a certain non MBMS (such as unicast services), the transmitter uses over allocation subframes to send the non MBMS (such as unicast services) data, and the control information in the MBMS resources of the over allocation subframes only carries the identification information of one or more protocol defined varieties of receivers, and ending the flow.

In above flow of this allocating method, when corresponding data are received:

one type of receivers defined in corresponding protocols (power is not limited, such as notebook PC terminals, and relay stations and so on) monitors all the subframes in current period (because the receiver does not know when the over allocation subframes are sent, and as such to ensure that terminals can receive the over allocation subframes), analyzes the control information in MBMS resources of an over allocation subframe, and receives data in this subframe according to the control information. Because the transmitter will not use the over allocation subframes to the receivers except for the protocol defined receivers, so other receivers (such as mobile phones supporting the MBMS and so on) receive corresponding subframes as existing techniques (such as the receivers supporting the MBMS receive the MBMS subframes).

For above examples, it should be noted that when the transmitter sends non MBMS data using the over allocation subframes to protocol defined one or more type of receives, the control information in MBMS resources of the over allocation subframes only carries the identification information of one or more protocol defined varieties of the receivers. However the receiver does not know when the over allocation subframes are sent, thus one or more protocol defined varieties of receivers need to monitor all the subframes, including the MBMS subframes and the over allocation subframes.

When a plurality of receivers monitor a certain number of subframes, each subframes and carried control information thereof will be sent down to each receiver, and each receiver will read the control information of the subframes (including the identification information of the receivers, the modulation mode and the data length and so on) and analyze this control information, and only the receivers related to the services bore in the subframes can successfully analyze the control information of the subframes to obtain corresponding parameters. If a receiver analyzes the control information successfully, then begins to analyze and obtain each variety of parameters to receive data in the subframes; or, if the receiver cannot analyze the control information of this subframe, then refuses receiving this subframe and continues to process the next subframe, until all the subframes are monitored. For instance, if a protocol defined receiver receives one over allocation subframe, but can not analyze the control information of this over allocation subframe, then refuses receiving data in this over allocation subframe, which refers to that this over allocation subframes is not sent to this receiver.

The present invention will be described using an application example below.

The system pre-defines the over allocation subframes using rules in corresponding protocols, namely make a convention that over allocation subframes of the MBMS resources are only used to one or more varieties of receivers which is not power limitation, and after the transmitter using the over allocation subframes to bear unicast services, the transmitter only uses the over allocation subframes of the MBMS resources for one protocol defined variety relay stations which have the unicast services, to send unicast services and due to the relay stations being powered by the power supply, so the power is not limited.

After calculating the number of required subframes according to current MBMS traffic, a certain system obtains that 37 subframes should be allocated to the MBMS in a scheduling period to satisfy the requirement of the MBMS transmitting. However, because of the limitation of the allocation algorithm, the most close 37 subframes allocation scheme can only allocate 40 subframes, which is obviously that 3 subframes are over allocated. For the purpose of describing conveniently, the 3 subframes are denoted as over allocation subframes.

For the transmitter, according to corresponding protocols, a base station directly uses unicast services in the 3 over allocation subframes which are over allocated to the MBMS to send unicast services to a relay station;

For the receiver, the relay station does not know when the over allocation subframes are sent, and thus this relay station monitors all the 40 subframes allocated to the MBMS all the time to assure the terminal can receive the 3 over allocation subframes, and receives data from the 3 over allocation subframes which are over allocated to the MBMS.

Of course, the present invention can also have other various examples. It is understood for the skilled in the art that various modifications and variations may be made on the present invention, and without deviating from the spirit and scope of the invention, these corresponding modifications and variations are all covered by the protection scope of attached claims of the present invention.

Industrial Applicability

The method according to the present invention can avoid configuring the MBMS for the over allocation MBMS subframes using complex scheduling algorithms, and implements the flexible allocation of the MBMS subframes. Through the method that sending the non MBMS using parts of the MBMS resources in the MBMS resources, the problem of the inflexibility of the MBMS resources allocation and the complexity of the system scheduling existed in the traditional techniques can be resolved.

What we claim is:

1. A method for allocating multimedia broadcast multicast service (MBMS) resources, comprising:
    way 1: a transmitter using parts of the MBMS resources allocated for the MBMS to send a non MBMS, and informing a receive of usage state of resources used to send the non MBMS in said parts of the MBMS resources through system information; or
    way 2: a transmitter using parts of the MBMS resources allocated for the MBMS to send a non MBMS only for one or more relay stations;
    wherein, said MBMS resources, in MBMS single frequency network (MBSFN) subframes allocated from a carrier in which the MBMS and the non MBMS are time division multiplexed, are composed by orthogonally frequency division multiplexed (OFDM) symbols except for OFDM symbols occupied by physical downlink control channel (PDCCH); and said parts of the MBMS resources are in parts of the MBSFN subframes which are allocated for the MBMS but are not used for transmitting the MBMS.

2. The method as claimed in claim 1, wherein in said way 1, said transmitter detects the usage state of resources for sending the non MBMS in current scheduling period, and if a utilization ratio of the resources for sending the non MBMS is larger than a pre-set threshold, then the transmitter schedules said parts of the MBMS resources to send the non MBMS, otherwise the transmitter does not schedules said parts of the MBMS resources.

3. The method as claimed in claim 2, wherein when said transmitter schedules said parts of the MBMS resources to send the non MBMS, control information in all the MBMS resources carries identification information of all the receivers; if said transmitter schedules MBMS required resources to send the MBMS, the transmitter does not schedules said parts of the MBMS resources, and control information in said parts of the MBMS resources carries identification information of corresponding receivers.

4. The method as claimed in claim 1, wherein in said way 1, said transmitter informs the receiver whether said parts of the MBMS resources are used by adding one bit identification in the system information.

5. The method as claimed in claim 1, wherein in said way 2, said transmitter receives terminal type registration information including a power limitation state of the receiver sent by said receiver during accessing, and chooses corresponding receivers to use the parts of the MBMS resources allocated for the MBMS to send the non MBMS according to the terminal type register information.

6. The method as claimed in claim 5, wherein in said way 2, when said transmitter uses parts of the MBMS resources allocated for the MBMS to send the non MBMS, control information in said parts of the MBMS resources only carries identification information of one or more relay stations.

7. The method as claimed in claim 1, wherein said system information is signaling used to informing the receivers by the transmitter, and said system information is system message, control signaling or dedicated signaling.

8. The method as claimed in claim 1, wherein in said transmitter using parts of the MBMS resources which are allocated for the MBMS to send a non MBMS, said parts of the MBMS resources are all the MBMS resources or zero.

9. The method as claimed in claim 1, wherein said parts of the MBMS resources includes idle MBMS resources which is not used to send the MBMS after said transmitter scheduling the MBMS, and idle MBMS resources of over allocation when said transmitter allocates the MBMS.

10. A method for receiving non multimedia broadcast multicast service (MBMS) data on MBMS resources, comprising: a receiver which has a non MBMS determining whether a transmitter uses parts of the MBMS resources to send non MBMS data according to received system information, if yes, then said receiver monitoring the MBMS resources which sends the non MBMS, and receiving non MBMS data from corresponding MBMS resources;
    wherein, said MBMS resources, in MBMS single frequency network (MBSFN) subframes allocated from a carrier in which the MBMS and the non MBMS are time division multiplexed, are composed by orthogonally frequency division multiplexed (OFDM) symbols except for OFDM symbols occupied by physical downlink control channel (PDCCH); and said parts of the MBMS resources are in parts of the MBSFN subframes which are allocated for the MBMS but are not used for transmitting the MBMS.

11. The method as claimed in claim 10, wherein according to bit identification in said system information, said receivers determines whether the transmitter uses parts of the MBMS resources.

12. The method as claimed in claim 10, wherein if said receiver determines that said transmitter does not uses said parts of the MBMS resources, then said receiver does not monitor the MBMS resources.

13. The method as claimed in claim 10, wherein when said receiver receives non MBMS data from corresponding MBMS resources, firstly analyzes control information including the identification information of receivers, a modulation mode and data length in corresponding MBMS resources, if analyzing successfully, then receives non MBMS data according to analyzed parameters; or refuses receiving data in said corresponding MBMS resources.

14. A method for receiving non multimedia broadcast multicast service (MBMS) data on MBMS resources, comprising: one or more relay stations monitoring control information in the MBMS resources, and receiving non MBMS data from corresponding MBMS resources;
  wherein, said MBMS resources, in MBMS single frequency network (MBSFN) subframes allocated from a carrier in which the MBMS and the non MBMS are time division multiplexed, are composed by orthogonally frequency division multiplexed (OFDM) symbols except for OFDM symbols occupied by physical downlink control channel (PDCCH); and said parts of the MBMS resources are in parts of the MBSFN subframes which are allocated for the MBMS but are not used for transmitting the MBMS.

15. The method as claimed in claim 14, wherein when receiving non MBMS data from corresponding MBMS resources, said receiver firstly analyzes control information including the identification information of receivers, a modulation mode and data length in corresponding MBMS resources, if analyzing successfully, then said receiver receives non MBMS data according to analyzed parameters; or refuses receiving data in said corresponding MBMS resources.

* * * * *